Feb. 16, 1937.  G. H. WOTRING  2,071,191
DIFFERENTIAL PRESSURE OPERATED INSTRUMENT
Filed April 1, 1936
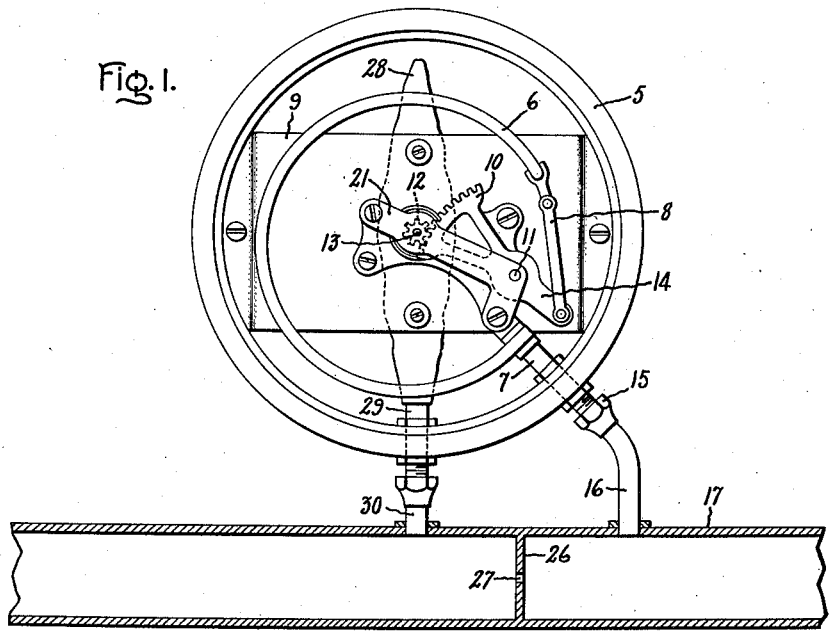
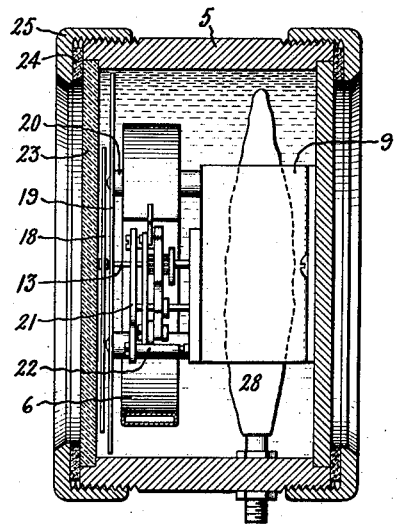
Inventor:
Gaylord H. Wotring,
by Harry E. Dunham
His Attorney.

Patented Feb. 16, 1937

2,071,191

UNITED STATES PATENT OFFICE 2,071,191

DIFFERENTIAL PRESSURE OPERATED INSTRUMENT

Gaylord H. Wotring, West Caldwell, N. J., assignor to General Electric Company, a corporation of New York Application April 1, 1936, Serial No. 72,108

5 Claims. (Cl. 73—109)

My invention relates to differential pressure operated instruments, such as flow meters for example.

One object of my invention is to provide an improved construction whereby an accurate indication of pressure difference may be obtained.

For a better understanding of my invention, together with other and further objects thereof, reference is had to the following description, taken in connection with the accompanying drawing, and its scope will be pointed out in the appended claims.

In the accompanying drawing, Fig. 1 is a simple form a pressure indicating gauge, partly in section, embodying my invention and connected to measure fluid flow in a conduit, and Fig. 2 is a side view, also partly in section, of the instrument illustrated in Fig. 1.

Referring to Fig. 1 in detail, I have illustrated one embodiment of my invention comprising a simple Bourdon tube pressure gauge comprising a housing 5, having a Bourdon tube 6 fastened at one end to an inlet pipe 7 and connected at its other end by a lever 8 to an indicating mechanism.

The Bourdon tube 6 comprises a flattened tube bent to form an open circle. One end of the tube is connected to the inlet pipe 7 which conducts the fluid, the pressure of which is to be measured, into the tube. The other end of the tube is closed so that fluid entering the tube expands the walls of the tube against the pressure of the surrounding medium. As the tube expands to approach a circular shape the cumulative action of this change in cross-section tends to straighten the tube along its axis and the free end of the tube is moved.

The indicating mechanism operated by the free end of the Bourdon tube comprises a base plate 9, a gear sector 10 pivoted at pin 11 and meshing with a pinion 12 mounted on a shaft 13. The lever 8 is connected to an arm 14 of the gear sector 10 and thereby causes a rotation of the indicator shaft 13 responsive to pressure variations within the tube 6. The inlet pipe is coupled by coupling 15 to a pipe 16 which in turn is connected to a conduit 17 in which the fluid flow is to be measured.

In Fig. 2 further details of the indicating mechanism are shown. A pointer 18 mounted on the end of the shaft 13 rotates in front of the dial 19. The dial 19 is mounted on the base plate 9 by spacing lugs 20. The shaft 13 and the pivot 11 rotate in bearings mounted in the base plate and a frame member 21 spaced from the base plate by spacing screws 22. This figure also shows the structure of the housing 5. It is provided with a glass 23 through which the pointer and dial are visible. For the purpose of my invention this housing is made fluid tight through the provision of suitable gaskets 24 and threaded collars 25.

The pipe 16 is connected to conduit 17 at one side of a pressure difference creating device which may be of any desired form. I have illustrated the simplest form of such devices comprising a wall 26 in the conduit 17 provided with an orifice 27 therein. The size of this opening is adjusted to build up a predetermined maximum fluid pressure difference for the maximum expected flow. Any lesser flow will build up a proportionately smaller pressure difference in accordance with the well-known Venturi tube principle. It should be noted here that the pressure difference on the two sides of the wall 26 is due only to the flow of the fluid through the orifice 27 and is entirely independent of the pressure of the fluid above atmospheric.

In order to obtain an accurate measurement of this fluid pressure and corresponding flow, it is necessary to accurately measure this pressure difference between the two sides of the wall 26, independently of the total pressure of the fluid in the pipe. In accordance with my invention, the instrument casing 5 is sealed against the atmosphere and filled with a non-compressible fluid, such as, glycerine, alcohol or similar liquids. The liquid should be transparent since the indicating dial will be covered thereby and the pointer will move therein. I then provide means to maintain the pressure of this liquid at that value which exists on the low pressure, or downstream, side of the pressure difference creating device 26 without loss of pressure or of the liquid in the case. In accordance with my invention this pressure is transmitted through a sack 28 partially inflated and made of a flexible material which is resistant to oil or other fluid used in the instrument or in the conduit 17. It may be made of a flexible fabric impregnated with an artificial resin. This resin may be one of the group of alkyl resins known by the trade name "Glyptal" and disclosed in U. S. Patents 1,897,260 or 1,975,569. The fabric may be impregnated with a plasticized polymerized vinyl halide as disclosed in U. S. Patent 1,929,453, or a rubber substitute may be used as, for example, polymer of chloro-2-butadiene-1,3 disclosed in U. S. Patent 1,967,863 and known by the trade name "Du Prene". Ordinary rubber impregnated fabric could, of course, be used, but its life under most conditions is too short for practical use.

The pressure transmitting device comprising the partially collapsed sack 28 is connected to a pipe 29 projecting through the wall of the casing 5 and is coupled to the pipe 30 which in turn is connected to the conduit 17 on the low pressure side of the wall 26. With this arrangement the instrument dial 19 with the pointer 18 are all immersed in the liquid and are visible through the window 23 of the casing 5.

It will be apparent, to those skilled in the art, that an instrument built in accordance with my invention may be built to withstand high pressures and if so built can measure accurately a difference of pressure of a few pounds when connected to a pipe line under several hundred pounds pressure without injuring the sensitive mechanism of the gauge nor destroying the flexible fabric sack.

Although I have described my invention as applied to flow meters, it may be readily applied to other instruments where it is desired to measure differential pressures. The simple Bourdon tube pressure gauge is illustrated only as an example. Any other expansible walled casing may be used to operate the necessary indicating or recording mechanism.

What I claim as new and desire to secure by Letters Patent of the United States is:

1. In a differential pressure measuring device the combination of a fluid tight housing, an expansible casing in said housing and connected to a pressure source, a substantially non-compressible fluid filling said housing and a second expansible casing within said housing and connected to a second pressure source whereby a movement of said first expansible casing is proportional to the difference in pressure between said two sources.

2. A differential pressure indicator comprising a Bourdon tube pressure gauge, a fluid tight housing therefor, a substantially non-compressible fluid filling said housing and surrounding said Bourdon tube, and a flexible fluid tight sack in said fluid connected to a pipe projecting through the wall of said housing, said sack being subjected to a secondary pressure which is transmitted to the outside of said Bourdon tube through said substantially non-compressible fluid.

3. In a differential pressure gauge the combination of a fluid-tight casing, a substantially non-compressible fluid filling said casing, a pair of flexible walled casings in said fluid connected respectively to two sources of pressure the difference between which is to be measured and an indicating mechanism operated by one of said casings.

4. In a differential pressure gauge the combination of a Bourdon tube adapted to be connected to a pressure source, a fluid tight housing therefor, a substantially non-compressible fluid filling said housing and a flexible walled casing in said housing adapted to be connected to another pressure source.

5. In a differential pressure gauge the combination of a Bourdon tube adapted to be connected to a pressure source, a fluid tight housing, a substantially non-compressible fluid filling said housing and a flexible walled casing in said fluid adapted to be connected to another pressure source, said latter casing comprising a fabric sack impregnated with a synthetic resin to make it fluid tight.

GAYLORD H. WOTRING.